Figure 1:
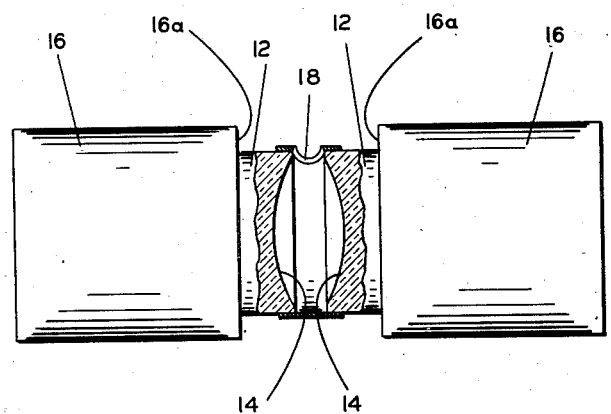

Dec. 2, 1947. M. N. FAIRBANK 2,431,927
MOLD FOR FORMING PRECISION MEMBERS
Filed Dec. 31, 1943

INVENTOR.
Merry N. Fairbank
BY
Donald L. Brown
Attorney

Patented Dec. 2, 1947

2,431,927

UNITED STATES PATENT OFFICE 2,431,927

MOLD FOR FORMING PRECISION MEMBERS

Murry N. Fairbank, Weston, Mass., assignor to Polaroid Corporation, Cambridge, Mass., a corporation of Delaware Application December 31, 1943, Serial No. 516,414

2 Claims. (Cl. 18—44)

This invention relates to molds for forming precision members, such as lenses.

A further object is to provide a novel mold member comprising said molding element.

The above and other objects and novel features of this invention will more fully appear from the following detailed description when the same is read in connection with the accompanying drawings. It is to be expressly understood, however, that the drawings are for purposes of illustration only and are not intended as a definition of the limits of the invention, reference being primarily had for this latter purpose to the appended claims.

Figure 2:
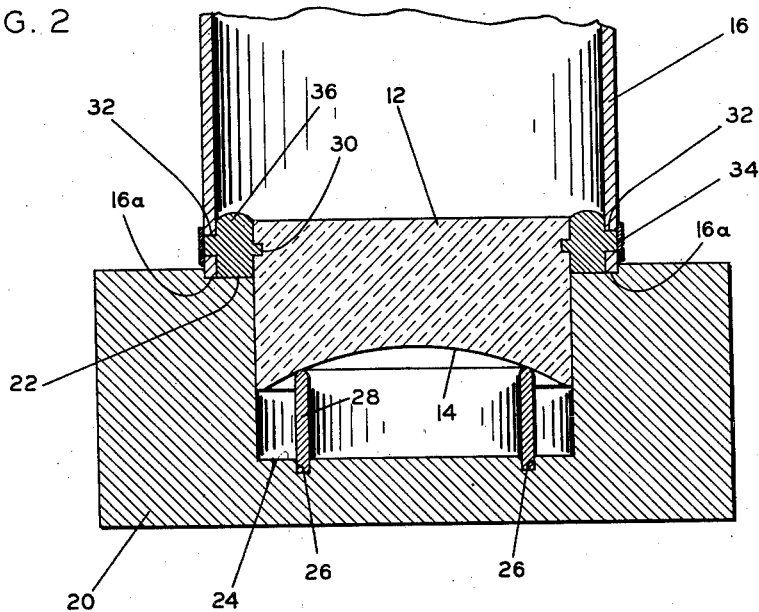

In the drawings, wherein like reference numerals refer to like parts throughout the several views:

Figure 1 is a view, in elevation, with parts broken away and shown in section, of a mold comprising members assembled in accordance with the present invention; and Fig. 2 is a sectional view showing one member of said mold being operatively assembled.

Referring to Fig. 1, there is shown a mold for the formation of precision elements, such as lenses, said mold in the form illustrated comprising a pair of elements 12 having concave, optically smooth surfaces 14 adapted to define the light-transmitting faces of a biconvex lens. Each of elements 12 is preferably formed of glass with surface 14 thereof accurately ground to the desired smoothness and shape, and each is rigidly fixed in one end of a cylindrical supporting member 16, preferably of metal. Each of said elements projects beyond the end of its supporting member to permit suitable means, such as a tape closure 18, to be wound over the edge portions of said elements in fluid-tight engagement therewith, said closure forming with surfaces 14 of said elements the lens-shaped cavity of the mold. Closure member 18 may be deformable to permit axial movement of elements 12 toward each other to compensate for shrinkage of the material being cast in the mold cavity.

To cast a lens, it is important that surfaces 14 be accurately aligned and that the separation of elements 12 be accurately predetermined. However, to prevent surfaces 14 from being marred, it is desirable that the spacing means for predetermining the separation of said elements do not engage said surfaces. To make this possible, each of elements 12 is accurately mounted centrally and axially in member 16 with surface 14 spaced a predetermined distance from the inner edge 16a of said member whereby the spacing of mold members 12, 16 can be achieved by means of a jig engaging the inner or outer ends of said members and the coaxial relation thereof can be obtained by coaxially mounting members 16. These features are particularly advantageous for molds for convex lenses where the mold faces are concave and it is difficult to use a spacer between surfaces 14 for predetermining the separation thereof.

Means are provided for readily assembling and securing each of element 12 in its supporting member 16 so that surface 14 is spaced a predetermined distance from the inner end 16a of said member and said element is centrally disposed in said member. As shown in Fig. 2, said means comprise a base member 20 having a relatively shallow cylindrical recess 22 formed therein, of a diameter substantially equal to the external diameter of member 16 whereby the latter member may be slidably mounted in said recess to have its position fixed relative to said base member. A second cylindrical recess or bore 24, of substantial depth, is provided in said base member and is centrally located relative to said shallow recess, said bore being of a diameter approximately equal to the diameter of element 12 and being adapted to receive the latter in a sliding fit. An annular groove 26, preferably concentric with the wall of bore 24, is provided at the bottom of said bore for receiving a spacer ring or sleeve 28.

To assemble the mold members 12, 16 (Fig. 2), element 12 is first inserted into bore 24 with surface 14 thereof in engagement with the rounded upper edge of spacer 28, the latter being accurately dimensioned so as to space the central point of surface 14 a predetermined distance from the bottom of shallow recess 22. Member 16 is then positioned in recess 22 and by engaging the bottom of said recess, has its lower or inner end 16a accurately spaced relative to surface 14 and by engaging the cylindrical wall of said recess, is concentrically disposed relative to element 12. The latter is preferably provided with a peripheral groove 30 in the portion thereof which extends into member 16, said groove being preferably substantially opposite a plurality of openings 32 provided in said member. To rigidly secure said element in said member, a suitable cement 36 is introduced into the annular space between said element and said member and fills groove 30 and openings 32, a ring member 34 being preferably mounted on the exterior of said member 16 to seal the outer ends of said openings during the introduction and hardening of the cement.

A suitable cement for securing together element 12 and member 16 is an alloy of the type having a melting point above the highest temperature to be used in casting the lens and having as nearly as possible no expansion or contraction at its solidifying temperature. An example of this type of alloy is an alloy of bismuth and lead in the proportions of substantially five parts of bismuth to four parts of lead. It is also possible to use soluble cements, such as mixtures of sodium silicate, with suitable fillers, as for example wood flour, pumice, or the like, and the refractory water-soluble cement sold under the trade name "Insalute."

After cement 36 has hardened, mold member 12, 16 may be removed as a unit from fixture 20, the elements thereof being assembled so that a known distance separates the central point of surface 14 from edge 16a.

There is thus provided a novel mold member whereby a glass element producing a molding surface and a support for said element are assembled in accurate relation to each other and wherein said element and said support may be rigidly secured together in a novel manner. The assembling device is formed to space the molding surface of the glass element a predetermined distance of the support therefor whereby measurements made in operatively positioning the molding surface of the assembled unit may be taken from said support.

Since certain changes in the constructions set forth which embody the invention may be made without departing from its scope, it is intended that all matter contained in the above description, or shown in the accompanying drawing, shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. In a mold, a tubular supporting member having a plurality of recesses adjacent one end thereof, a cylindrical mold element of glass having at least one optically smooth molding surface and a portion thereof extending within said supporting member, said element having a groove formed therein, and means comprising a cement contained in said groove and in said recesses for rigidly securing said element to said member.

2. In a mold, a tubular supporting member having a plurality of recesses adjacent one end thereof, a cylindrical mold element of glass having at least one optically smooth molding surface and a portion thereof extending within said supporting member, said element having an annular peripheral groove formed therein, and means comprising an alloy having substantially zero expansion and contraction at the temperature at which it solidifies contained in said groove and said recesses for rigidly securing said element to said member.

MURRY N. FAIRBANK.

REFERENCES CITED

The following references are of record in the file of this patent:

UNITED STATES PATENTS

| Number | Name | Date |
|---|---|---|
| 2,003,465 | Rabezzana | June 4, 1935 |
| 2,177,461 | Ruthven | Oct. 24, 1939 |
| 2,305,945 | Williams | Dec. 22, 1942 |
| 909,487 | Wallace | Jan. 12, 1909 |
| 1,615,474 | Midgley | Jan. 25, 1927 |
| 1,834,763 | Bonsieur | Dec. 1, 1931 |
| 2,304,664 | Smith | Dec. 8, 1942 |
| 2,333,051 | Smith | Oct. 26, 1943 |
| 1,665,445 | Conrad | Apr. 10, 1928 |
| 2,204,442 | Patrick | June 11, 1940 |
| 2,075,477 | Smith | Mar. 30, 1937 |